US012573301B2

(12) United States Patent
Shimizu et al.

(10) Patent No.: US 12,573,301 B2
(45) Date of Patent: Mar. 10, 2026

(54) SURROUNDINGS MONITORING SYSTEM AND PROGRAM

(71) Applicants: DENSO CORPORATION, Kariya-city (JP); TOYOTA JIDOSHA KABUSHIKI KAISHA, Toyota (JP)

(72) Inventors: Naotsugu Shimizu, Tokyo (JP); Koji Takeuchi, Toyota (JP); Masanori Tokuda, Toyota (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 18/670,451

(22) Filed: May 21, 2024

(65) Prior Publication Data

US 2024/0312348 A1      Sep. 19, 2024

Related U.S. Application Data

(63) Continuation of application No. PCT/JP2022/041390, filed on Nov. 7, 2022.

(30) Foreign Application Priority Data

Nov. 23, 2021      (JP) ................................. 2021-189767

(51) Int. Cl.
*G08G 1/16*          (2006.01)
*B60Q 9/00*          (2006.01)

(52) U.S. Cl.
CPC ............. *G08G 1/167* (2013.01); *B60Q 9/008* (2013.01)

(58) Field of Classification Search
None
See application file for complete search history.

(56) References Cited

U.S. PATENT DOCUMENTS

2013/0242102 A1* 9/2013 Tsuchiya ................ G08G 1/166
                                                              348/148
2017/0345312 A1  11/2017 Shimizu et al.
                     (Continued)

FOREIGN PATENT DOCUMENTS

JP        2016-085567 A        5/2016
JP        2019-084885 A        6/2019
JP        2019-151185 A        9/2019

*Primary Examiner* — Muhammad Adnan
(74) *Attorney, Agent, or Firm* — Maschoff Brennan

(57)          ABSTRACT

A surroundings monitoring system (30) is used with a system-mounted vehicle (40) equipped with an object sensor (21, 22) which senses an object around the system-mounted vehicle. When a vehicle approaching from behind the system-mounted vehicle on a road where the system-mounted vehicle is moving is detected by the object sensor, the surroundings monitoring system performs a collision avoidance task depending upon whether a predetermined warning condition for the approaching vehicle is met. The surroundings monitoring system determines whether a non-target vehicle is present in a region on the road which is defined to extend from the system-mounted vehicle to the approaching vehicle. The non-target vehicle is a vehicle not meeting the warning condition. When the non-target vehicle is determined to be present, the surrounding monitoring system inhibits the collision avoidance task from being performed for the approaching vehicle present behind the non-target vehicle.

8 Claims, 7 Drawing Sheets

(56)         References Cited

U.S. PATENT DOCUMENTS

| | | | | |
|---|---|---|---|---|
| 2018/0293894 A1* | 10/2018 | Zhang | .................. | B60W 50/14 |
| 2019/0088137 A1* | 3/2019 | Yamada | ................... | B60R 1/12 |
| 2019/0126927 A1 | 5/2019 | Uejima | | |
| 2019/0270448 A1 | 9/2019 | Takasao | | |
| 2020/0324776 A1 | 10/2020 | Uejima | | |
| 2021/0300243 A1* | 9/2021 | Shimizu | ................ | G08G 1/166 |
| 2022/0319324 A1* | 10/2022 | Allen | ....................... | G07C 5/04 |

\* cited by examiner

SURROUNDINGS MONITORING SYSTEM AND PROGRAM

CROSS REFERENCE TO RELATED DOCUMENT

The present application claims the benefit of priority of Japanese Patent Application No. 2021-189767 filed on Nov. 23, 2021, the disclosure of which is incorporated in its entirety herein by reference.

TECHNICAL FIELD

This disclosure relates generally to a surroundings monitoring system and a program.

BACKGROUND OF ART

The above type of surroundings monitoring system is known which is used with a vehicle (which will also be referred to as a host vehicle) equipped with an object sensor which detects an object around the host vehicle and works to determine whether a vehicle approaching the host vehicle is preusing an output from the object sensor. For instance, a first patent literature listed below teaches a surroundings monitoring system which, when a vehicle which is present in an adjacent lane located adjacent to a host lane in which the host vehicle is moving and is approaching from behind the host vehicle is detected by the object sensor, performs a collision avoidance task associated with the approaching vehicle to warn a driver of the host vehicle depending upon whether a predetermined warning condition is met.

PRIOR ART DOCUMENT

Patent Literature

FIRST PATENT LITERATURE: Japanese Patent First Publication No. 2016-85567

SUMMARY OF THE INVENTION

For instance, when the host vehicle stops at an intersection on the road, and an adjacent-lane vehicle also stops in an adjacent lane located adjacent to a host lane in which the host vehicle is present, there may be a case where a vehicle approaches the host vehicle from behind the adjacent-lane vehicle. When such a case is encountered, the warning condition may be met in the above surroundings monitoring system to warn the driver of the host vehicle of the presence of the approaching vehicle regardless of a positional relation between the adjacent-lane vehicle and the approaching vehicle. Such warning is not supposed to be made, which may impose some burden on the driver of the host vehicle.

This disclosure was made in view of the above problem. It is a principal object to provide a surroundings monitoring system and a program which is capable of performing a collision avoidance task for an approaching object in a suitable manner.

This disclosure is to provide a surroundings monitoring system for use with a system-mounted vehicle equipped with an object sensor which senses an object around the system-mounted vehicle. When an approaching vehicle that is a vehicle approaching from behind the system-mounted vehicle on a road where the system-mounted vehicle is moving is detected by the object sensor, the surroundings monitoring system works to perform a collision avoidance task depending upon whether a predetermined warning condition for the approaching vehicle is met. The surroundings monitoring system comprises: (a) a presence-of-non-target vehicle determiner which determines whether a non-target vehicle is present in a region on the road which is defined to extend from the system-mounted vehicle to the approaching vehicle, the non-target vehicle being a vehicle which does not meet the warning condition; and (b) a warning task inhibitor which, when the non-target vehicle is determined to be present, inhibits the collision avoidance task, which would be performed when the warning condition is met, from being performed for the approaching vehicle present behind the non-target vehicle.

When a non-target vehicle is present in a region between the host vehicle and the approaching object on the road in which the host vehicle is moving, it will cause the non-target vehicle to disturb or block the approach of the object to the host vehicle. In other words, when a non-target vehicle is present in front of the vehicle moving toward or approaching the host vehicle, there is a decreased probability that the approaching vehicle collides with the host vehicle.

Accordingly, in this disclosure, when a non-target vehicle (s) is determined to be present, the surroundings monitoring system is designed to inhibit the collision avoidance task, which would be performed when the warning condition is determined to be met, from being performed for an approaching object present behind the non-target vehicle. In other words, the collision avoidance task is inhibited from being performed for an object which is approaching the host vehicle and has a low probability of collision with the host vehicle. This minimizes the number of times an unnecessary collision avoidance task is performed.

BRIEF DESCRIPTION OF THE DRAWINGS

The above-described object, other objects, features, or beneficial advantages in this disclosure will be apparent from the following detailed discussion with reference to the drawings.

In the drawings.

MODE FOR CARRYING OUT THE INVENTION

First Embodiment

The first embodiment realizing the surroundings monitoring system 10 in this disclosure will be described below with reference to the drawings. The surroundings monitoring system 10 in the first embodiment is mounted on an automotive vehicle (which will also be referred to as a host vehicle or system-mounted vehicle 40) and designed to monitor an object which is moving on a lane of a road adjacent to a lane on which the system-mounted vehicle 40 is traveling and now approaching the system-mounted vehicle 40.

Figure 1:
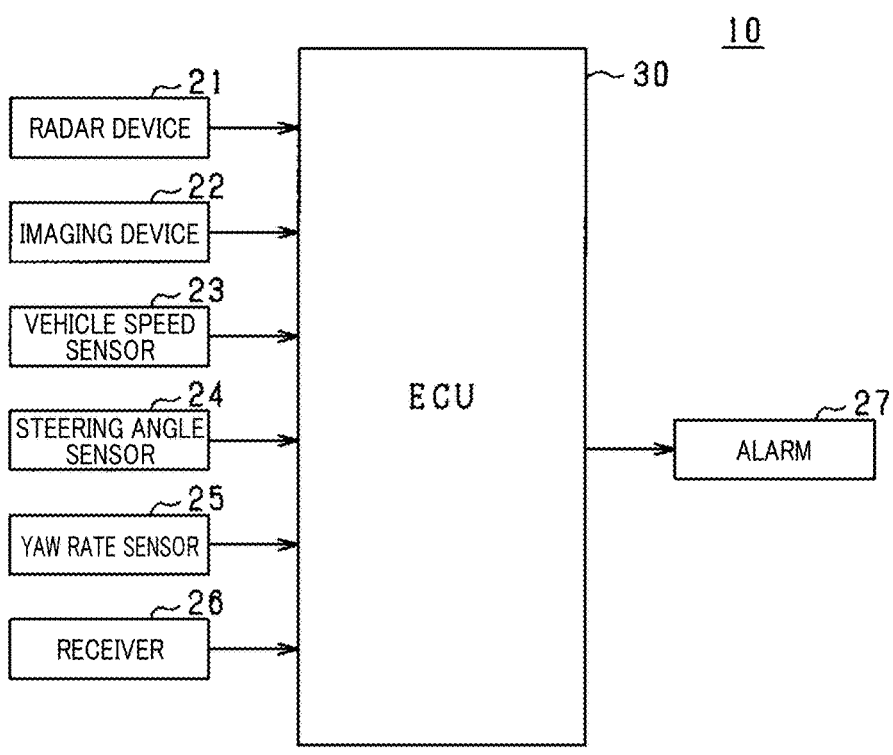
FIG. 1 is a view which illustrates an overall structure of a surroundings monitoring system according to the first embodiment.

The surroundings monitoring system 10 in this embodiment, as illustrated in FIG. 1, includes the radar device 21, the imaging device 22, the vehicle speed sensor 23, the steering angle sensor 24, the yaw rate sensor 25, the receiver 26, the alarm 27, and the ECU 30. In this embodiment, the radar device 21 serves as an object detecting device. The ECU 30 serves as a surroundings monitoring system.

The radar device 21 is implemented by, for example, a known millimeter-wave radar working to transmit a high-frequency signal in a millimeter-wave band. The radar device 21 is mounted on, for example, a rear end of the system-mounted vehicle 40 to detect the position of an object present in a given radar sensing zone. Specifically, the radar device 21 works to transmit a radar wave in a preselected cycle and receives a return of the radar wave (which will also be referred to as a reflected wave or reflected signal) using a plurality of antennas. The radar device 21 also works to calculate a distance to the object as a function of a time when the radar wave was transmitted and a time when the reflected wave was received. The radar device 21 also works to calculate a relative speed of the object as a function of a frequency of the reflected wave changed from that of the transmitted radar wave due to the Doppler effect. The radar wave 21 also works to calculate a direction (azimuth and elevation angles) of the object as a function of a phase difference between the reflected signals received by the plurality of antennas. The radar device 21 outputs sensed data, such as the distance to the object, the relative speed of the object, the direction of the object, etc. to the ECU 30.

Figure 2:
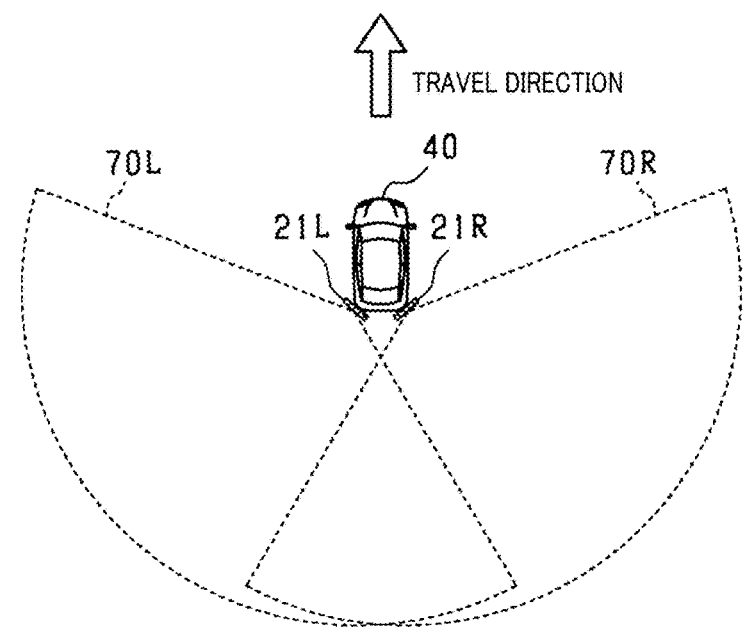
FIG. 2 is a view which demonstrates a sensed region around a host vehicle.

The radar device 21, as clearly illustrated in FIG. 2, includes the radar 21R and the radar 21L which are mounted on a right portion and a left portion of a rear end of the system-mounted vehicle 40, respectively, in order to sense an object(s) located directly or diagonally behind the system-mounted vehicle 40. The radar 21L mounted on the left portion of the rear end of the system-mounted vehicle 40 works to detect an object present in the radar sensing zone 70L. The radar 21R mounted on the right portion of the rear end of the system-mounted vehicle 40 works to detect an object present in the radar sensing zone 70R.

The imaging device 22 may include a monocular camera, such as a CCD camera, a CMOS imaging sensor, or a near-infrared cameras or a stereo camera. The system-mounted vehicle 40 may include a plurality of imaging devices 22. The imaging device 22 is secured to, for example, the center of the width of the system-mounted vehicle 40 at a preselected height and works to capture an image of a rearward view behind the system-mounted vehicle 40 in a given angular range in an overhead view mode. The imaging device 22 sequentially outputs a captured image to the ECU 30.

The vehicle speed sensor 23 measures a speed at which the system-mounted vehicle 40 is moving. The vehicle speed sensor 23 may be implemented by a road wheel speed sensor designed to measure a speed of rotation of a wheel of the system-mounted vehicle 40. The vehicle speed sensor 23 outputs the measured speed of the system-mounted vehicle 40 in the form of a traveling speed signal to the ECU 30.

The steering angle sensor 24 is secured to, for example, a steering rod of the system-mounted vehicle 40 to measure an angular position of a steering wheel of the system-mounted vehicle 40. The steering angle sensor 24 works to output a signal (which will also be referred to as a steered angle signal) as a function of an angular position of the steering wheel manipulated by a driver in the system-mounted vehicle 40 to the ECU 30.

The yaw rate sensor 25 works to measure an angular velocity of rotation of the system-mounted vehicle 40 around a yaw axis thereof and output a yaw rate signal indicative of the measured angular velocity to the ECU 30.

The receiver 26 is implemented by, for example, GPS receiver which works to receive a position signal from a satellite positioning system. Specifically, the receiver 26 receives a position signal indicative of a current position of the system-mounted vehicle 40 and outputs it to the ECU 30.

The alarm 27 outputs an alarm to the driver of the system-mounted vehicle 40. For instance, the arm 27 is implemented by an acoustic device, such as a speaker or a buzzer, or a visual device, such as a display or a warming light installed in a passenger compartment of the system-mounted vehicle 40. Specifically, the alarm 27 performs a warning 25 task to output a warning sound, turn on an indicator mounted in a side mirror, or inform of lock/unlock conditions of doors of the system-mounted vehicle 40 to warn the driver of the system-mounted vehicle 40.

The functions or operations performed by the ECU 30 may be realized by software stored in a tangible memory, a computer executing the software, only software, only hardware, or a combination thereof. In a case where the ECU 30 is constructed by a hardware electronic circuit, it may be provided by a digital circuit including a plurality of logic circuits or alternatively by an analog circuit. For instance, the ECU 30 works to execute programs stored in a storage device, such as a non-transitory tangible storage medium installed therein. The programs include that illustrated in FIG. 7. The execution of the programs realizes corresponding operational steps. The storage device may be implemented by a non-volatile memory. The program retained in the storage device may be updated using a network, such as an internet.

The ECU 30 analyzes an output signal from the radar device 21 to determine whether an object is approaching the system-mounted vehicle 40 in an adjacent lane that is located adjacent to a host lane in which the system-mounted vehicle 40 is now moving. The ECU 30 also analyzes a result of the determination and works to perform a collision avoidance task (also referred to below as a warning task) to warn the driver to avoid a potential collision. Specifically, the ECU 30 calculates a TTC (Time to collision) that is an expected remaining time to a collision of the system-mounted vehicle 40 with a target object moving in the adjacent lane as a function of a relative distance between the system-mounted vehicle 40 and the target object and a relative speed of the target object to the system-mounted vehicle 40. When the TTC is lower than a given threshold, the ECU 30 determines that a warning condition to warn the driver of a risk of accident is met and then actuates the alarm 27. The target object approaching the system-mounted vehicle 40 usually includes one or more of a four-wheeled automotive vehicle, a motorcycle, a bicycle, and a pedestrian. The ECU 30 may be designed to analyze data on a captured image of a sensed region around an object approaching the system-mounted vehicle 40 to produce segments of the image which show features of the object and determine whether the object should be viewed as a target.

Figure 3:
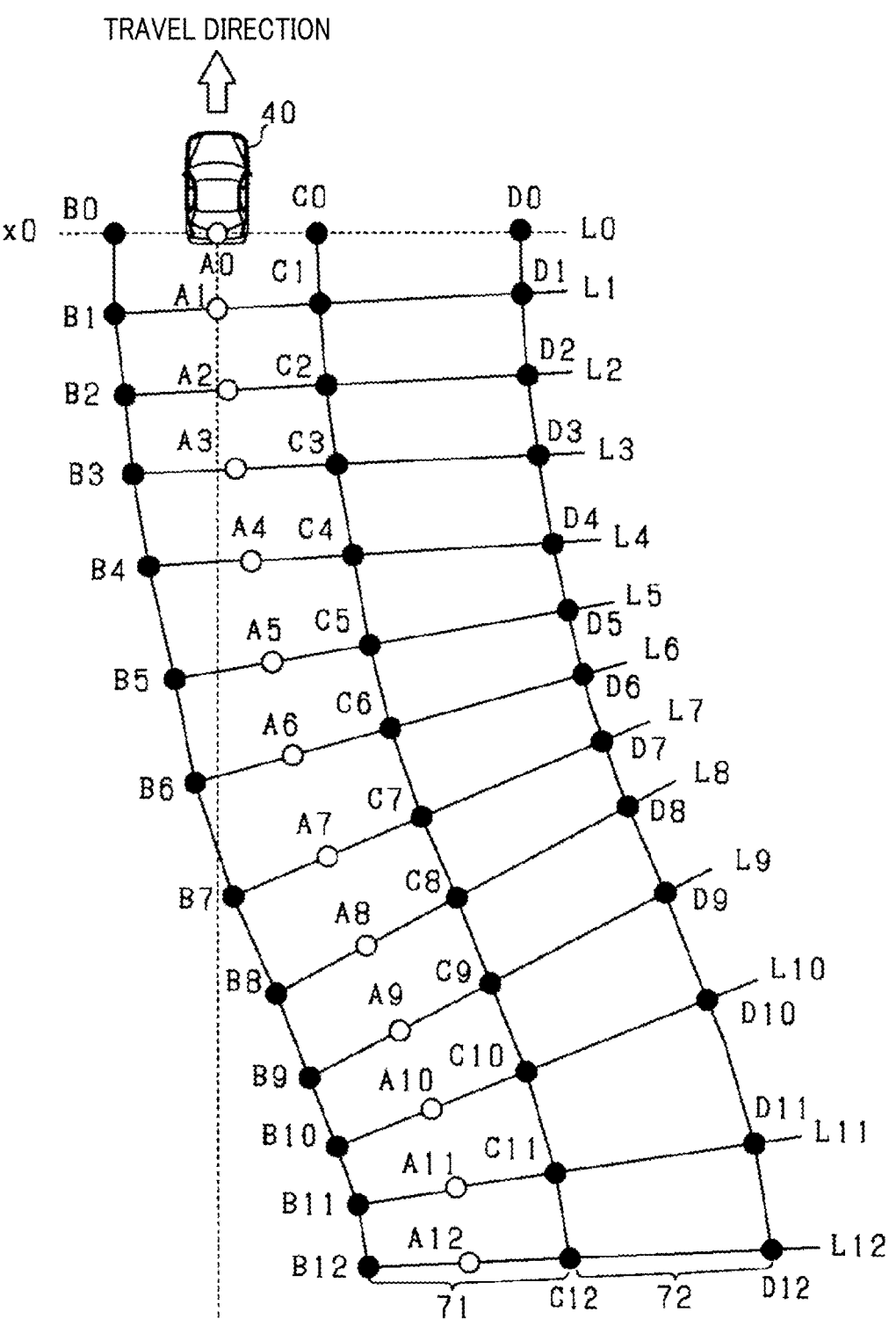
FIG. 3 is a view which illustrates a host travel zone in which a host vehicle is moving and an adjacent travel zone located adjacent to the host-vehicle travel zone.

In this embodiment, a lane calculation is made to calculate or determine a host lane in which the system-mounted vehicle 40 is traveling using a locus of movement of the system-mounted vehicle 40 (which will also be referred to as a travel locus). How to make the lane calculation will be described below in detail. Specifically, how to determine the host travel zone 71 in which the system-mounted vehicle 40 is traveling and the adjacent travel zone 72 which is located on the right side of the host travel zone 71 will be discussed using FIG. 3.

First, when the system-mounted vehicle 40 is moving, the ECU 30 sequentially derives points Ai which indicate positions of the system-mounted vehicle 40 on the travel locus. The ECU 30 calculates lateral lines Li for the points Ai using angular positions (i.e., turning angle) Oi of the system-mounted vehicle 40. The ECU 30 also defines points Bi, Ci, and Di on each of the lateral lines Li using the width of the host lane in which the system-mounted vehicle 40 is now moving. The points Bi, Ci, and Di correspond to edge points of the host lane and the adjacent lane. The widths of the host lane and the adjacent lane may be derived using an output from the imaging device 22 or the receiver 26 or alternatively be predetermined.

The ECU 30 calculates the points Ai to Di where i=0 to n. The ECU 30 defines the points Bi and Ci as edge points of the host lane and determines an area delimited by the points B0 to Bn and C0 to Cn as the host travel zone 71 following the system-mounted vehicle 40. Similarly, the ECU 30 defines the points Ci and Di as edge points of the adjacent lane and determines an area delimited by the points C0 to Cn as the adjacent travel zone 72 following the system-mounted vehicle 40. In this embodiment, the ECU 30 is designed to determine whether an object behind the system-mounted vehicle 40 in the adjacent travel zone 72 is approaching the system-mounted vehicle 40. The ECU 30 may, therefore, determine at least the adjacent travel zone 72.

When the system-mounted vehicle 40 is moving or stops at an intersection on the road, and a vehicle is in the adjacent travel zone 72 (which will also be referred to as an adjacent-lane vehicle), but a condition to perform the warning task for the adjacent-lane vehicle is not met, the ECU 30 does not perform the warning task which warns the driver. In this case, the adjacent-lane vehicle is a non-target vehicle which has a low risk of colliding with the system-mounted vehicle 40 and is, thus, excluded from targets for implementing the warning task. There is a probability that when a non-target vehicle is in the adjacent travel zone 72, and a second vehicle (which will also be referred to below as an approaching vehicle) is approaching the system-mounted vehicle 40 from behind the non-target vehicle, the warning condition may be met for the second vehicle, so that the warning task is undesirably performed for the second vehicle.

In order to alleviate the above risk, the EUC 30 in this embodiment is designed to inhibit the warning task from being performed when there is a non-target vehicle is in the adjacent travel zone 72, and the warning condition is met for a second vehicle approaching the system-mounted vehicle from behind the non-target vehicle. Specifically, the ECU 30 calculates a travel zone in which the second vehicle approaching the system-mounted vehicle 40 is expected to travel from now and, when the travel zone for the second vehicle overlaps that for the non-target vehicle, inhibits the warning task from being performed for the second vehicle even when the warning condition is met for the second vehicle.

Figure 4:
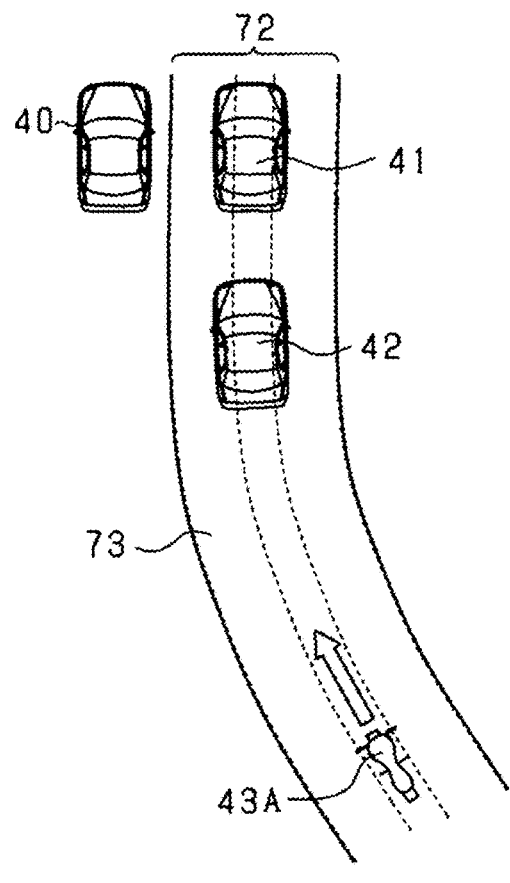
FIG. 4 is a view which illustrates a positional relation between a host vehicle and other vehicles.

FIG. 4 demonstrates an example where travel zones of a non-target vehicle and a second vehicle approaching the system-mounted vehicle 40 from behind the non-target vehicle overlap or are aligned with each other. In the example, the first and second vehicles 41 and 42 are present lateral and adjacent to the system-mounted vehicle 40 in the adjacent travel zone 72, and the third vehicle 43A is also present behind the first and second vehicles 41 and 42. The first and second vehicles 41 and 42 are illustrated as an example as four-wheel vehicles, while the third vehicle 43A is illustrated as an example as a motorcycle, but however, they may be other types of vehicles. The first and second vehicles 41 and 42 are adjacent vehicles which are moving adjacent to the system-mounted vehicle 40 at a speed of zero relative to the system-mounted vehicle 40, while the third vehicle 43A is an approaching vehicle which is moving at a speed higher than that of the system-mounted vehicle 40 and approaching the system-mounted vehicle 40 from behind it.

In the above example, the ECU 30 analyzes positions and speeds of the first to third vehicles 41 to 43A in the adjacent travel zone 72 relative to the system-mounted vehicle 40 and determines the first and second vehicles 41 and 42 as being non-target vehicles and the third vehicle 43A as being an approaching vehicle. The ECU 30 also analyzes the position of the third vehicle 43 in the adjacent travel zone 72 in a width direction of the adjacent travel zone 72 and calculates the travel zone 73 in which the third vehicle 43A continues to or is expected to advance. In the example demonstrated in FIG. 4, the travel zone 73 of the third vehicle 43A overlaps regions where the first and second vehicles 41 and 42 are present. There is, thus, a low probability that the third vehicle 43 will overtake the first and second vehicles 41 and 42. The ECU 30, therefore, determines that the warning task should be inhibited from being performed with respect to the third vehicle 43A even if the warning condition is met.

Figure 5:
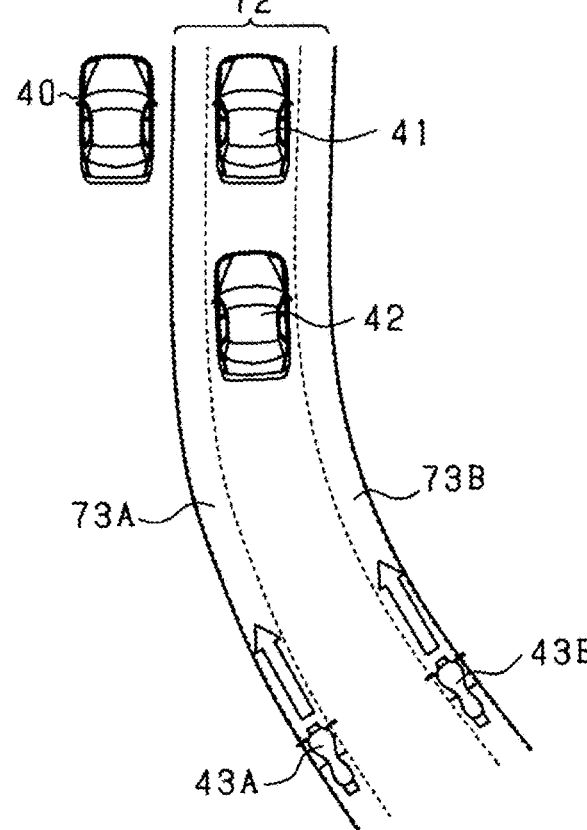
FIG. 5 is a view which illustrates a positional relation between a host vehicle and other vehicles.

Alternatively, when the travel zone of the approaching vehicle (i.e., the third vehicle 43A) is out of overlap with the regions where the non-target vehicles (i.e., the first and second vehicles 41 and 42) are present, in other words, travel zones of the non-target vehicles, the ECU 30 performs the warning task depending on whether a portion of the adjacent travel zone 72 which overlaps the travel zone of the approaching vehicle is located close to or away from the system-mounted vehicle 40. FIG. 5 demonstrates an example where the travel zone of the approaching vehicle is out of overlap with the travel zones of the non-target vehicles. In FIG. 5, the first and second vehicles 41 and 42 are, like in FIG. 4, illustrated as non-target vehicles in the adjacent travel zone 72, the third vehicle 43A is illustrated as an approaching 20) vehicle moving in a region of the adjacent travel zone 72 which is located close to the system-mounted vehicle 40, and the third vehicle 43B is illustrated as an approaching vehicle moving in a region of the adjacent travel zone 72 which is located away from the system-mounted vehicle 40. The travel zone 73A is a zone in which the third vehicle 43A is expected to move in the future. The travel zone 73B is a zone in which the third vehicle 43B is expected to move in the future. FIG. 5 shows two approaching vehicles: the third vehicles 43A and 43B as being moving adjacent each other for the simplicity of illustration, but however, at least one of them may be present behind the system-mounted vehicle 40.

In FIG. 5, the third vehicle 43A is moving on the left side of the adjacent travel zone 72, so that portions of the adjacent travel zone 72 which are occupied by the first and second vehicles 41 and 42 do not overlap the travel zone 73A of the third vehicle 43A, and the travel zone 73A is located close to the system-mounted vehicle 40 within the adjacent travel zone 72. There is, therefore, a probability that the third vehicle 43A which is moving close to the system-mounted vehicle 40 within the adjacent travel zone 72 may overtake the first and second vehicles 41 and 42. The ECU 30, thus, works to perform the warning task for the third vehicle 43A upon satisfaction of the warning condition without any inhibition thereof.

The third vehicle 43B is moving on the right side of the adjacent travel zone 72, so that portions of the adjacent travel zone 72 which are occupied by the first and second vehicles 41 and 42 do not overlap the travel zone 73B of the third vehicle 43B, and the travel zone 73B is located away from the system-mounted vehicle 40 within the adjacent travel zone 72. There is, therefore, a probability that the third vehicle 43B which is moving away from the system-mounted vehicle 40 within the adjacent travel zone 72 may overtake the first and second vehicles 41 and 42, but however, the third vehicle 43B is located on the opposite side of each of the first and second vehicles 41 and 42 to the system-mounted vehicle 40. The ECU 30, thus, works to inhibit the warning task for the third vehicle 43B from being performed even if the warning condition is met.

Figure 6:
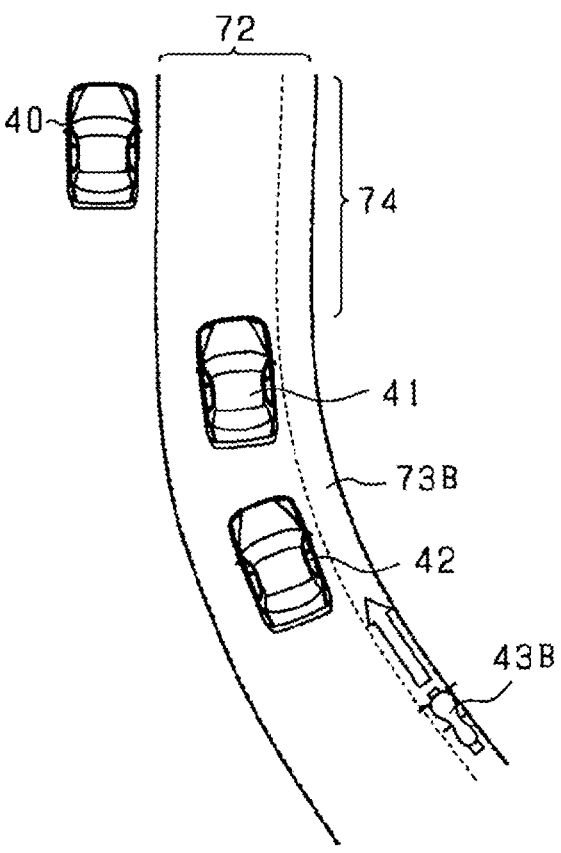
FIG. 6 is a view which illustrates a positional relation between a host vehicle and other vehicles.

In a case where the third vehicle 43B is, as demonstrated in FIG. 6, moving on the right side of the adjacent travel zone 72, there is a probability that the first and second vehicles 41 and 42 may be located behind the system-mounted vehicle 40, and the vehicle-unoccupied area 74 may exist on the right side of the system-mounted vehicle 40. In such a case, after overtaking the first and second vehicles 41 and 42, the third vehicle 43B can approach the system-mounted vehicle 40 within the vehicle-unoccupied area 74. It is, therefore, advisable that an area (i.e., the vehicle-unoccupied area 74 in FIG. 6) of the adjacent travel zone 72 which is located between the system-mounted vehicle 40 and a leading one (i.e., the first vehicle 41 in FIG. 6) of non-target vehicles following the system-mounted vehicle 40 be determined as a warning task-implementation area where the warning task should be performed for the third vehicle 43B.

When regions where the first and second vehicles 41 and 42 are present do not overlap the travel zone 73B of the third vehicle 43B, and the travel zone 73B is located away from the system-mounted vehicle 40 within the adjacent travel zone 72, the ECU 30 defines the vehicle-unoccupied area 74 that is, of an area where the warning condition is met for the third vehicle 43B, a portion which is located between the system-mounted vehicle 40 and the first vehicle 41 (i.e., a leading one of the non-target vehicles) following the system-mounted vehicle 40 as the warning task-implementation area. In other words, when the third vehicle 43B is moving on the right side of the adjacent travel zone 72 and expected to overtake the first and second vehicles 41 and 42, the ECU 30 inhibits the warning task from being performed until the third vehicle 43B overtakes the first and second vehicles 41 and 42, but however, the ECU 30 cancels the inhibition of the warning task after the third vehicle 43B overtakes the first and second vehicles 41 and 42 and performs the warning task in response to the warning condition being met.

Figure 7:
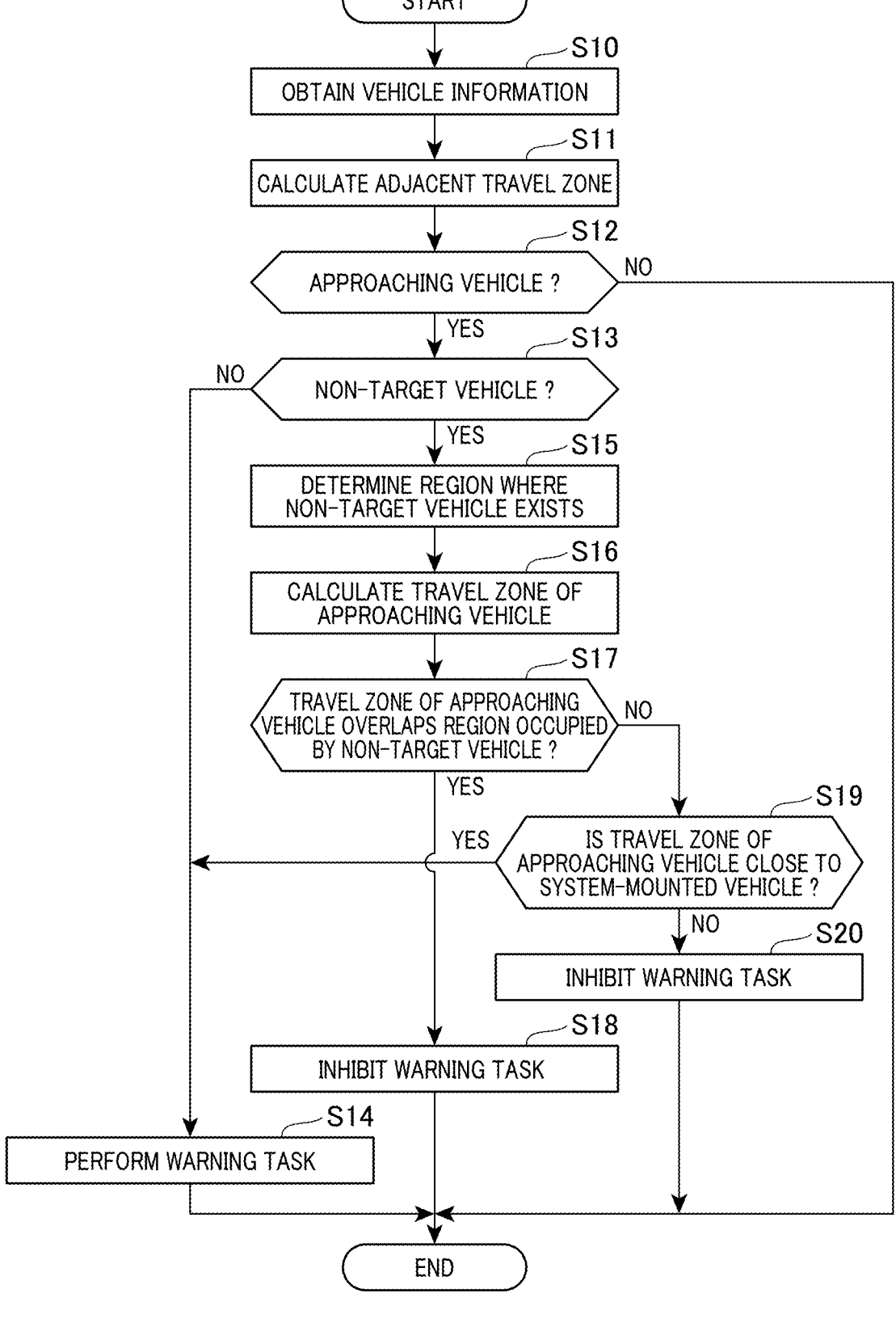
FIG. 7 is a flowchart of a sequence of steps of a control task performed by an ECU.

FIG. 7 shows a sequence of steps of a control task accomplished by the ECU 30. The control task is performed in a given cycle.

First, in step S10, information about the system-mounted vehicle 40 and a vehicle(s) surrounding the system-mounted vehicle 40. For instance, the ECU 30 derives an output from the radar device 21, data on an image(s) captured by the imaging device 22, a speed, a steered angle, and a yaw rate of the system-mounted vehicle 40, and/or GPS data from the receiver 26.

The routine proceeds to step S11 wherein the adjacent travel zone 72 is calculated. In this embodiment, the adjacent travel zone 72 is, as already described with reference to FIG. 3, derived using a locus defined by movement of the system-mounted vehicle 40, an angular position, and a width of the system-mounted vehicle 40. Specifically, in a case where the system-mounted vehicle 40 is moving on a multi-lane road, at least one of a right area located on the right side of a host lane (i.e., the host travel zone 71) in which the system-mounted vehicle 40 is moving and a left area located on the left side of the host lane is defined as an adjacent lane (i.e., the adjacent travel zone 72) depending on a current position of the system-mounted vehicle 40 on the multi-lane road. For instance, in a case where a road on which the system-mounted vehicle 40 is moving is a four-lane road having sets of two lanes for traffic in opposite directions, when the system-mounted vehicle 40 is traveling on a left one of the one set of lanes, the right lane is determined as the adjacent travel zone 72. Conversely, when the system-mounted vehicle 40 is traveling on a right one of the one set of lanes, the left lane is determined as the adjacent travel zone 72.

The routine proceeds to step S12 wherein it is determined whether there is a vehicle approaching the system-mounted vehicle 40 from behind it in the adjacent travel zone 72.

If a YES answer is obtained, then the routine proceeds to step S13 wherein there is a non-target vehicle in the adjacent travel zone 72 which is a vehicle not meeting the warning condition. Specifically, when a vehicle is detected in the adjacent travel zone 72, it is determined whether the TTC of the detected vehicle is higher than the given threshold. If such a TTC is higher than the given threshold, the detected vehicle is determined as a non-target vehicle. If a NO answer is obtained in step S13 meaning that the detected vehicle is a target vehicle in the adjacent travel zone 72, then the routine proceeds to step S14. The operation in step S13 functions as a presence-of-non-target vehicle determiner.

In step S14, the warning task is performed in the above-described way. Specifically, when the vehicle approaching the system-mounted vehicle 40 in the adjacent travel zone 72 is determined to have a TTC lower than the given threshold, the warning task is performed to warn the driver of the system-mounted vehicle 40 of the presence of the approaching vehicle.

Alternatively, if a YES answer is obtained in step S13 meaning that a non-target vehicle is in the adjacent travel zone 72, then the routine proceeds to step S15 wherein a region where the non-target vehicle is present is determined.

The routine proceeds to step S16 wherein the travel zone 73 of the approaching vehicle is calculated. Specifically, the travel zone 73 is determined using a position of the approaching vehicle in the width direction of the adjacent travel zone 72. The operation in step S16 functions as a travel zone calculator.

The routine proceeds to step S17 wherein it is determined whether the region where the non-target vehicle is present overlaps the travel zone 73 of the approaching vehicle. If a YES answer is obtained in step S17, then the routine proceeds to step S18.

In step S18, the warning task to warn the driver of the system-mounted vehicle 40 is inhibited from being performed. The ECU 30, therefore, does not sound an alarm to the driver even when the TTC of the approaching vehicle is lower than the given threshold.

Alternatively, if a NO answer is obtained in step S17, then the routine proceeds to step S19 wherein it is determined whether the travel zone 73 of the approaching vehicle is located close to the system-mounted vehicle 40. If a YES answer is obtained, then the routine proceeds to step S14 wherein the warning task is performed in the manner described above.

Alternatively, if a NO answer is obtained in step S19 meaning that the travel zone of the approaching vehicle is located away from the system-mounted vehicle 40, then the routine proceeds to step S20 wherein the warning task to warn the driver of the system-mounted vehicle 40 of the presence of the approaching vehicle is inhibited from being performed even when the warning condition is met. Additionally, in step S20, when the non-target vehicle (or a preceding one of the non-target vehicles) present in the adjacent travel zone 72 is located behind the system-mounted vehicle 40, of a region where the warning condition, such as a TTC, is met for an approaching vehicle in the adjacent travel zone 72, a portion (i.e., the vehicle-unoccupied area 74 in FIG. 6) extending between the system-mounted vehicle 40 (e.g., the front of the system-mounted vehicle 40) and the non-target vehicle (or the preceding one of the non-target vehicles) may be determined as the warning task-implementation area. In such a case, when the approaching vehicle passes through an area of the adjacent travel zone 72 which is located away from the system-mounted vehicle 40 and then enters the vehicle-unoccupied area 74, the ECU 30 performs the warning task depending on whether the warning condition is met. The operations in steps S17 to S20 function as a warning task inhibitor.

When the routine proceeds to step S14 after a YES answer is obtained in step S19, the warning task is performed depending on whether the warning condition is met even if a non-target vehicle(s) is present in the adjacent travel zone 72, however, it is advisable that the warning condition for the approaching vehicle be set harder than that when there is no non-target vehicle(s) in the adjacent travel zone 72 (i.e., a NO answer is obtained in step S13). It is also preferable that a warning task inhibition condition to inhibit the warning task from being performed when the approaching vehicle is moving close to the system-mounted vehicle 40 is set looser than that when the approaching vehicle is moving away from the system-mounted vehicle in the adjacent travel zone 72.

The above-described embodiment produces the following beneficial advantages.

When a non-target vehicle is present in the adjacent travel zone 72 and is located between the system-mounted vehicle 40 and a vehicle moving toward the system-mounted vehicle 40 in the adjacent travel zone 72, it will cause the non-target vehicle to disturb or block the approach of the vehicle to the system-mounted vehicle 40. In other words, when a non-target vehicle is present in front of the vehicle moving toward or approaching the system-mounted vehicle 40, there is a decreased probability that the approaching vehicle collides with the system-mounted vehicle 40.

Accordingly, when a non-target vehicle(s) is detected in the adjacent travel zone 72, this embodiment inhibits the warning task from being performed for the driver of the system-mounted vehicle 40. This results in a decrease in unwanted number of times that the driver is warned about approaching of a vehicle(s) which has a low risk of collision with the system-mounted vehicle 40, thereby optimizing a warning for the driver of the system-mounted vehicle 40.

When a non-target vehicle is present in the adjacent travel zone 72 and is located between the system-mounted vehicle 40 and a vehicle moving toward the system-mounted vehicle 40 in the adjacent travel zone 72, it will cause the non-target vehicle to disturb or block the approaching of the vehicle to the system-mounted vehicle 40. The approaching vehicle may, however, pass by the non-target vehicle, that is, overtake the non-target vehicle, which results in an increase in risk of collision of the system-mounted vehicle 40 with the approaching vehicle. In order to alleviate such a drawback, this embodiment works to calculate a travel zone in which the approaching vehicle is expected to travel in the future and inhibit the warning task from being performed in a condition that a region currently occupied by the non-target vehicle overlaps the calculated travel zone of the approaching vehicle. Specifically, the fact that the region currently occupied by the non-target vehicle overlaps the calculated travel zone of the approaching vehicle means that the approaching vehicle is expected not to overtake the system-mounted vehicle 40. In such a case, this embodiment works to inhibit the warning task from being performed.

When the travel zone of the approaching vehicle moving in the adjacent travel zone does not overlap the region currently occupied by the non-target vehicle, there is a probability that the approaching vehicle overtakes the non-target vehicle. It is, therefore, preferable to perform the warning task depending upon the warning condition. The probability that the system-mounted vehicle 40 collides with the approaching vehicle is, however, different between when the approaching vehicle moves in a portion of the adjacent travel zone which is close to the system-mounted vehicle 40 and takes over the system-mounted vehicle 40 and when the approaching vehicle moves in a portion of the adjacent travel zone which is away from the system-mounted vehicle 40 and takes over the system-mounted vehicle 40. It is, therefore, advisable to perform the warning task in view of the travel zone (i.e., the position) of the approaching vehicle. Consequently, the surroundings monitoring system 10 in this embodiment is designed to inhibit the warning task from being performed depending upon whether the travel zone of the approaching vehicle lies close to or away from the system-mounted vehicle 40 within the adjacent travel zone (i.e., the adjacent lane) when the region where the non-target vehicle is currently present does not overlap the travel zone of the approaching vehicle. This optimizes a warning for the driver of the system-mounted vehicle 40.

When the region where the non-target vehicle is present does not overlap the travel zone of the approaching vehicle, and the travel zone of the approaching vehicle is located away from the system-mounted vehicle 40 within the adjacent travel zone, as long as the non-target vehicle is behind the system-mounted vehicle 40, there is a probability that after the approaching vehicle takes over the non-target vehicle, the system-mounted vehicle 40 collides with the approaching vehicle. Consequently, when the region where the non-target vehicle is present does not overlap the travel zone of the approaching vehicle, and the travel zone of the approaching vehicle is located away from the system-mounted vehicle 40 within the adjacent travel zone, the surroundings monitoring system 10 defines, as the warning task-implementation area, an unoccupied area of the adjacent travel zone which extends from the system-mounted vehicle 40 to the non-target vehicle or a leading one of the non-target vehicles moving behind the system-mounted vehicle 40. The surroundings monitoring system 10 in this embodiment is, therefore, capable of warning the driver of the system-mounted vehicle 40 when lying in a region where there is a probability that the system-mounted vehicle 40 collides with the approaching vehicle and also inhibiting the warning task from being performed when the system-mounted vehicle 40 lies in another region.

Second Embodiment

The second embodiment will be described below in terms of differences between itself and the first embodiment with reference to the drawings. This embodiment is designed to analyze a change in relative position between the system-mounted vehicle 40 and a non-target vehicle in inhibition of the warning task.

The surroundings monitoring system 10 in the first embodiment is designed to monitor a vehicle which is present behind a non-target vehicle moving in the adjacent lane and is approaching the system-mounted vehicle 40 and to inhibit the warning task for the approaching vehicle from being performed when the warning task inhibition condition is satisfied, but however, may alternatively be designed to alter the warning task inhibition condition in light of a change in relation between the system-mounted vehicle 40 and the approaching vehicle which usually arises from a change in position of the non-target vehicle relative to the system-mounted vehicle 40. For instance, when a non-target vehicle moving in a lane on the right side of the host lane of the system-mounted vehicle 40 turns right, a non-target vehicle on the adjacent lane accelerates, or the system-mounted vehicle 40 decelerates, it will usually result in a change in position of the non-target vehicle relative to the system-mounted vehicle 40. This results in disappearance of interruption to further approach of the approaching vehicle to the system-mounted vehicle 40 or facilitates movement of the approaching vehicle closer to the system-mounted vehicle 40. In such a case, it is preferable to perform the warning task for the driver of the system-mounted vehicle 40.

Consequently, the ECU 30 in this embodiment is designed to determine whether a relative position between the system-mounted vehicle 40 and the non-target vehicle is changing when the region currently occupied by the non-target vehicle is determined as overlapping the travel zone of the approaching vehicle. Specifically, the ECU 30 determines whether a first vehicle that is a non-target vehicle moving in the adjacent lane is activating a direction indicator light (i.e., a turn signal) or whether the first vehicle is accelerating or the system-mounted vehicle 40 is decelerating, so that a relative speed of the first vehicle and the system-mounted vehicle 40 is increasing, thus resulting in a change in relative position of the system-mounted vehicle 40 and the non-target vehicle. When determining that the relative position of the system-mounted vehicle 40 and the non-target vehicle is expected to change or changing, the ECU 30 performs the warning task to warn about the approaching vehicle in the above-described manner.

Figure 8:
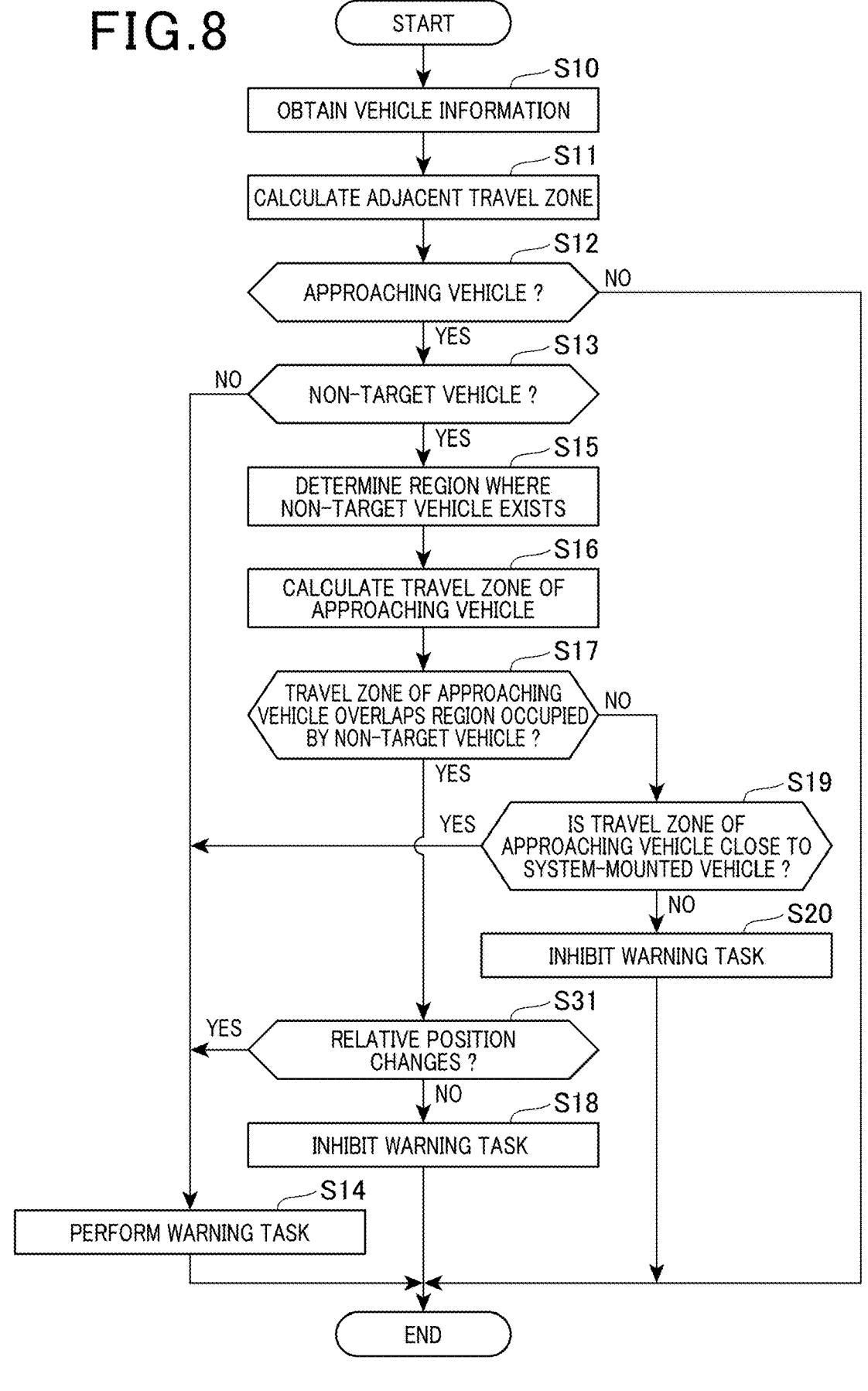
FIG. 8 is a flowchart of a sequence of steps of a control task performed by an ECU in the second embodiment.

FIG. 8 shows a sequence of steps of a control task accomplished by the ECU 30 in the second embodiment. The control task is initiated when a vehicle approaching the system-mounted vehicle 40 is detected in the adjacent lane. The same steps or operations as those in FIG. 7 are denoted by the same step numbers for the sake of convenience.

If a YES answer is obtained in step S17, then the routine proceeds to step S31 wherein a relative position of the system-mounted vehicle 40 and the non-target vehicle is expected to change or changing. If a NO answer is obtained meaning that the relative position of the system-mounted vehicle 40 and the non-target vehicle is expected not to change or not changing, then the routine proceeds to step S18 wherein the warning task is inhibited from being performed in the manner as described above. Alternatively, if a YES answer is obtained in step S31, then the routine proceeds to step S14 wherein the warning task is performed in the manner as described above. The operation in step S31 plays a role as a position calculator.

As apparent from the discussion, when it is determined in step S31 that the relative position of the system-mounted vehicle 40 and the non-target vehicle is expected to change or changing, the ECU 30 works to decrease the degree to which the warning task is inhibited from being performed as compared with when it is determined that the relative position of the system-mounted vehicle 40 and the non-target vehicle continues to be kept constant.

When it is determined that there is a non-target vehicle is in the adjacent lane, the second embodiment is, as described above, capable of inhibiting the warning task from being performed depending upon whether the relative position of the non-target vehicle and the system-mounted vehicle 40 is expected to change in the future. In other words, when there is a low probability that the system-mounted vehicle 40 collides with the approaching vehicle, but when such a collision probability is expected to increase from now, the surroundings monitoring system 10 is capable of warning the driver of the system-mounted vehicle 40 of approach of another vehicle to the system-mounted vehicle 40.

Other Embodiments

The above embodiments may be modified in the following ways.

When there is a non-target vehicle in the adjacent lane, and an approaching vehicle is present behind the non-target vehicle and is approaching the system-mounted vehicle 40, the ECU 30 may determine whether a size of the approaching vehicle is large enough to overtake or pass by the non-target vehicle on the adjacent lane and inhibit the warning task from being performed depending upon a result of such a determination. Specifically, in step S17 shown in FIG. 7, the ECU 30 determines whether the approaching vehicle has a width small enough to overtake the non-target vehicle in the adjacent lane and also determines whether the region currently occupied by the non-target vehicle overlaps the travel zone of the approaching vehicle in the adjacent lane. The width of the approaching vehicle may be calculated as a function of the type of the approaching vehicle or an area of the adjacent lane which is occupied by the approaching vehicle.

In step S17, when the approaching vehicle is determined not to have a width small enough to overtake the non-target vehicle in the adjacent lane or the region currently occupied by the non-target vehicle overlaps the travel zone of the approaching vehicle, the routine proceeds to step S18 wherein the warning task to warn the driver of the system-mounted vehicle 40 about the presence of the approaching vehicle is inhibited from being performed. Alternatively, when the approaching vehicle is determined to have a width small enough to overtake the non-target vehicle in the adjacent lane or the region currently occupied by the non-target vehicle does not overlap the travel zone of the approaching vehicle, the routine proceeds to step S19. When it is determined in step S17 that the approaching vehicle does not have a width small enough to overtake the non-target vehicle in the adjacent lane, the routine may proceed directly to step S18 without determining whether the region currently occupied by the non-target vehicle overlaps the travel zone of the approaching vehicle.

When there is a vehicle which is present behind the system-mounted vehicle 40 and is approaching the system-mounted vehicle 40 on the host lane, the ECU 30 may turn on hazard lights to warn a driver of the approaching vehicle of the presence of the system-mounted vehicle 40. Specifically, when an object is detected on the host lane in which the system-mounted vehicle 40 is now moving, the ECU 30 determines whether the TTC of the object is lower than the threshold. When the TTC is determined to be lower than the threshold, the ECU 30 turns on the hazard lights to warn the object of the presence of the system-mounted vehicle 40. When there is a non-target vehicle behind the system-mounted vehicle 40 in the host lane, and the region currently occupied by the non-target vehicle overlaps the travel zone of the approaching vehicle, the ECU 30 inhibits the warning task from being performed. A control task executed by the ECU 30 in such a case will be explained with reference to FIG. 9. In the example demonstrated in FIG. 9, the vehicle 51 is present as a non-target vehicle behind the system-mounted vehicle 40 in the host travel zone 71. At least one of the approaching vehicles 52A and 52B is present behind the vehicle 51. The speed of the vehicle 51 relative to the system-mounted vehicle 40 is about zero, while the approaching vehicles 52A and 52B are moving at a speed higher than that of the system-mounted vehicle 40 and approaching from behind the system-mounted vehicle 40. For instance, the system-mounted vehicle 40 and the vehicle 51 are at a stop, while the approaching vehicles 52A and 52B are moving closer to the vehicle 51 from behind it.

Figure 9:
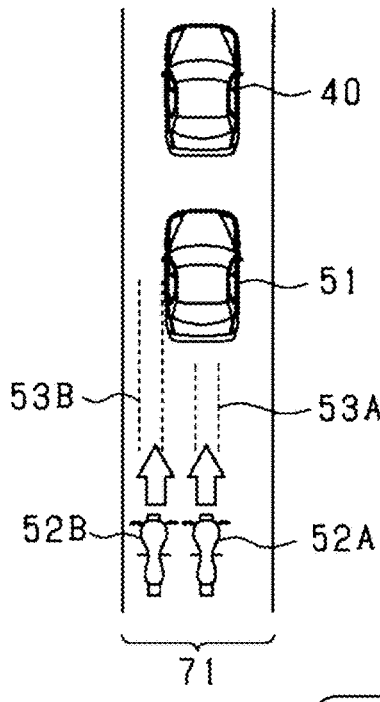
FIG. 9 is a view which illustrates a positional relation between a host vehicle and other vehicles in another embodiment.

In the example in FIG. 9, the travel zone 53A of the approaching vehicle 52A overlaps the region currently occupied by the vehicle 51. The ECU 30, therefore, inhibits the warning task from warning the approaching vehicle 52A of the presence of the system-mounted vehicle 40 even if the warning condition is met. In contrast, the travel zone 53B of the approaching vehicle 52B does not overlap the region currently occupied by the vehicle 51. The ECU 30, therefore, performs the warning task to warn the approaching vehicle 52B of the presence of the system-mounted vehicle 40 when the warning condition is met.

The above structure of the surroundings monitoring system 10 is capable of warning the approaching vehicles 52A and 52B moving behind the system-mounted vehicle 40 in the host lane of the presence of the system-mounted vehicle 40 in an appropriate manner.

The ECU 30 may be configured to perform the collision avoidance task to detect the approaching vehicle moving in the host lane in which the system-mounted vehicle 40 is traveling and determine whether the TTC of the detected approaching vehicle is lower than the threshold. When the TTC is lower than the threshold, the ECU 30 may warn the driver of the system-mounted vehicle 40 of the presence of the approaching vehicle. For instance, the ECU 30 may perform the warning task to warn the driver of the system-mounted vehicle 40 that another vehicle is approaching rapidly from behind the system-mounted vehicle 40 or to urge the driver to make a lane change to the adjacent lane.

In light of the fact that a change in position of the vehicle 51 relative to the system-mounted vehicle 40 in FIG. 9 may result in a change in positional relation between the system-mounted vehicle 40 and the approaching vehicle 52A, the warning task inhibition condition may be altered. For instance, when the vehicle 51 turns right or left, it will cause the position of the vehicle 51 relative to the system-mounted vehicle 40 to change, thereby enabling the approaching vehicle 52A to advance close to the system-mounted vehicle 40. In view of this, when the region currently occupied by the vehicle 51 overlaps the travel zone 53A in which the approaching vehicle 52A is expected to advance, the ECU 30 determines whether the relative position of the system-mounted vehicle 40 and the vehicle 51 is expected to change. If an affirmative answer is obtained, the ECU 30 performs the warning task to warn the system-mounted vehicle 40 of the probability of approach of the approaching vehicle 52A in the manner described above.

The ECU 30 may be designed both to warn the driver of the system-mounted vehicle 40 of the presence of an approaching vehicle(s) moving in the adjacent lane and to warn an approaching vehicle(s) moving in the host lane of the presence of the system-mounted vehicle 40.

The surroundings monitoring system 10 may be equipped with an ultrasonic sensor or LIDAR (Light Detection and Ranging or Laser Imaging Detection and Ranging) sensor instead of the radar device 21.

The ECU 30 in the above embodiments works to inhibit the warning task from being performed so that no alarm sound is outputted, but however, may alternatively be designed to decrease the degree to which the warning task is performed by, for example, lowering the volume of the alarm sound or changing the type of the alarm sound. Alternatively, the system-mounted vehicle 40 may be equipped with an indicator installed in a door mirror which is turned on to warn the driver of the system-mounted vehicle 40 of a risk of any accidents. The ECU 30 may inhibit the warning task from being performed by keeping the indicator off. The ECU 30 may alternatively decrease the intensity of brightness of the indicator or change the color of light of the indicator to soft color in the inhibition of the warning task.

The ECU 30 in the above embodiments works to warn the driver of the system-mounted vehicle 40 of the presence of a vehicle approaching from behind it or warn a driver of a vehicle approaching the system-mounted vehicle of the presence of the system-mounted vehicle 40 in the collision avoidance task, but however, may alternatively be designed to lock the doors of the system-mounted vehicle 40 to make it impossible to open the doors from inside the system-mounted vehicle 40 in the collision avoidance task in order to eliminate a risk that the approaching vehicle may collide with an occupant(s) of the system-mounted vehicle 40 when the occupant gets out of the system-mounted vehicle 40. For instance, at least one or some of the doors facing the side on which the approaching vehicle is moving may be locked. In a case where the system-mounted vehicle 40 is designed to have doors which, when locked, are prevented from being opened from outside the system-mounted vehicle 40, but permitted to be opened from inside the system-mounted vehicle 40, the ECU 30 may prevent the doors from being opened from inside the system-mounted vehicle 40 temporarily until safety is ensured against the approaching vehicle moving from behind the system-mounted vehicle 40.

The ECU 30 may alternatively be designed to brake or steer the system-mounted vehicle 40 in the collision avoidance task for a vehicle(s) approaching from behind the system-mounted vehicle 40. The braking or steering of the system-mounted vehicle 40 is for avoiding collision of the system-mounted vehicle 40 with the approaching vehicle when the system-mounted vehicle 40 makes a lane change.

When detecting the approaching vehicle moving in the adjacent lane or the host lane, the ECU 30 may determine whether the approaching vehicle is driving aggressively to interrupt the movement of the system-mounted vehicle 40. The aggressive driving is tailgating including decreasing of a relative distance of the approaching vehicle to the system-mounted vehicle 40 (i.e., a follow distance from the system-mounted vehicle 40) to approach the system-mounted vehicle 40, inappropriate flashing of headlights of the approaching vehicle, inappropriate repetition of sounding the horn, or weaving of the approaching vehicle behind the system-mounted vehicle 40. When determining that the approaching vehicle is driving aggressively, the ECU 30 may perform the warning or collision avoidance task for the approaching vehicle. Alternatively, when determining that the approaching vehicle is not driving aggressively, the ECU 30 may inhibit the collision avoidance task from being performed depending on the presence or absence of the non-target vehicle.

Specifically, when determining that the relative distance between the system-mounted vehicle 40 and the approaching vehicle is less than a predetermined distance, the ECU 30 determines that the approaching vehicle is driving aggressively. The ECU 30 sets a fixed value (e.g., 5 m) as the predetermined distance or variably calculates the predetermined distance as a function of the speed of the system-mounted vehicle 40. For instance, when the speed of the system-mounted vehicle 40 is higher, the ECU 30 sets the predetermined distance to be shorter than that when the speed of the system-mounted vehicle 40 is lower.

The ECU 30 may be designed to determine whether the approaching vehicle is driving aggressively using the behavior of the approaching vehicle in addition to determination of whether the relative distance between the system-mounted vehicle 40 and the approaching vehicle is smaller than the predetermined distance. For instance, when the system-mounted vehicle 40 is located close to the approaching vehicle with the relative distance being less than the predetermined distance, and when detecting the fact that the approaching vehicle is flashing the headlights to the system-mounted vehicle 40, sounding the horn, or continues to weave for a preselected time (e.g. 5 seconds) or more, the ECU 30 may determine that the approaching vehicle is now driving aggressively. The flashing of the headlights or the weaving of the approaching vehicle may be detected by analyzing an image captured by the imaging device 22. The surroundings monitoring system 10 is equipped with a microphone which detects sound around the system-mounted vehicle 40. The honking of the horn of the approaching vehicle may be detected using the sound captured by the microphone.

The ECU 30 may be designed to determine whether the approaching vehicle is driving aggressively using the behavior of the system-mounted vehicle 40 in addition to determination of whether the relative distance between the system-mounted vehicle 40 and the approaching vehicle is smaller than the predetermined distance. For instance, the driver of the system-mounted vehicle 40 may frequently make a lane change in order to avoid the approach to the approaching vehicle. Consequently, when determining that the relative distance between the system-mounted vehicle 40 and the approaching vehicle is less than the predetermined distance, and the system-mounted vehicle 40 is making a lane change a number of times, the ECU 30 may determine that the approaching vehicle is now driving aggressively. When the approaching vehicle has moved fairly close to the system-mounted vehicle 40, this may cause the driver of the system-mounted vehicle 40 to be afraid, thereby resulting in instability in steering the system-mounted vehicle 40. In view of this, when detecting the fact that the relative distance between the system-mounted vehicle 40 and the approaching vehicle is less than the predetermined distance, and the steered angle of the steering wheel of the system-mounted vehicle 40 is varying over a given angular range, the ECU 30 may determine that the approaching vehicle is driving aggressively. The ECU 30 may analyze an output signal from the steering angle sensor 24 to detect the fact that the system-mounted vehicle 40 is making a lane change a number of times or the angle by which the steering wheel is rotated is varying over the given angular range.

When determining that the approaching vehicle is driving aggressively, the ECU 30 may perform an alerting task to inform a police station or a security service that the system-mounted vehicle 40 is subjected to the aggressive driving. The ECU 30 may output information about the current position of the system-mounted vehicle 40 and/or contact information about the driver to the police station or the security service. The ECU 30 may use a wireless communications device installed in the surroundings monitoring system 10 to inform the emergency event to the police station or security service. The wireless communications device may use V2X (Vehicle to X or vehicle-to-vehicle) or mobile network using a radio wave through a cellular phone base station.

When determining that the approaching vehicle is driving aggressively, the ECU 30 may work to perform image processing. The image processing is to store a captured image of the approaching vehicle in a storage device installed in the surroundings monitoring system 10. For instance, the ECU 30 record an image captured by the imaging device 22 in the storage device. In a case where the surroundings monitoring system 10 is equipped with a dashboard camera in addition to the imaging device 22, the ECU 30 may start recording the approaching vehicle using the dashboard camera.

When determining that the approaching vehicle is driving aggressively, the ECU 30 may perform a locking operation to lock the doors to hold them from being opened from outside the system-mounted vehicle 40.

Figure 10:
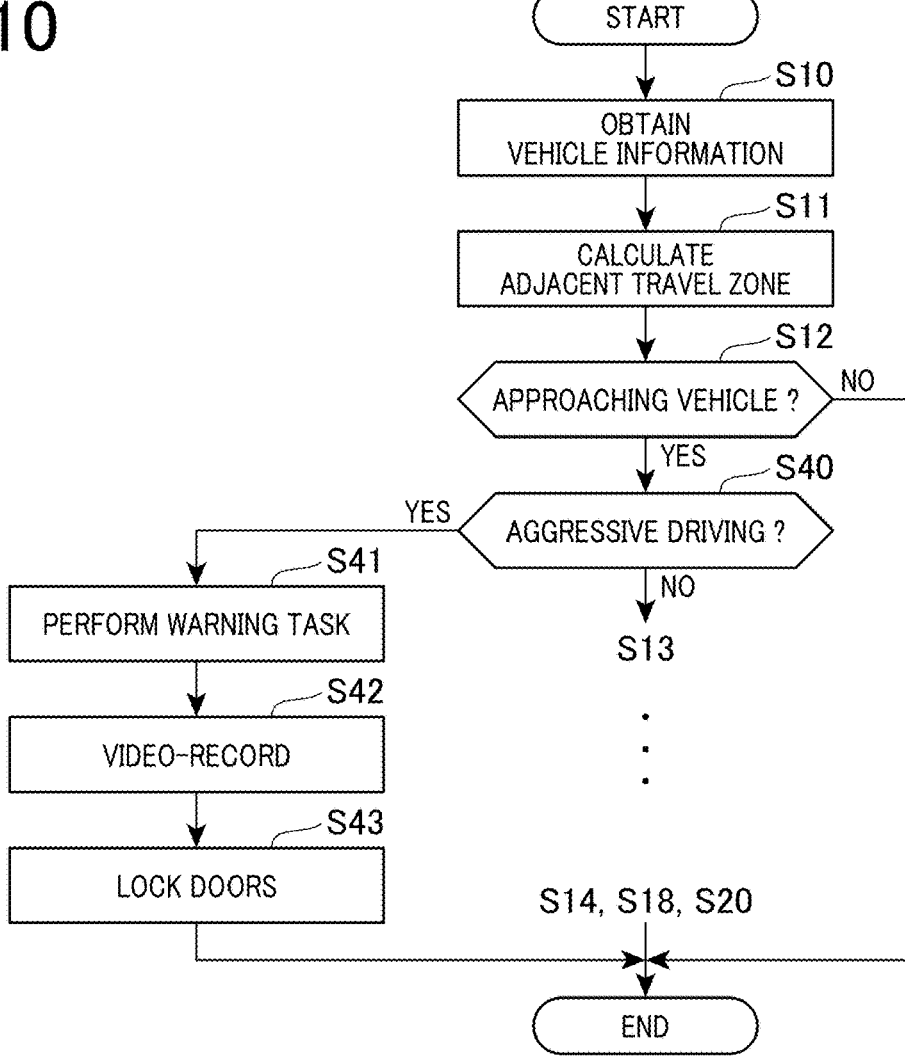
FIG. 10 is a flowchart of a sequence of steps of a control task performed by an ECU in another embodiment.

FIG. 10 shows a sequence of steps of a control task performed in a preselected cycle by the ECU 30. In FIG. 10, the same step numbers as those in FIG. 7 refer to the same operations, and explanation thereof in detail will be omitted here. Steps S13 to S20 which have been already discussed in FIG. 7 are omitted in FIG. 10 for the brevity of disclosure.

If it is determined in step S12 that there is the approaching vehicle, then the routine proceeds to step S40 wherein it is determined whether the approaching vehicle is tailgating or driving aggressively. If a NO answer is obtained in step S40, then the routine proceeds to step S13. Alternatively, if a YES answer is obtained, then the routine proceeds to step S41.

In step S41, the warning task is performed in the manner described above. The routine then proceeds to step S42 wherein the surroundings are videorecorded. The routine proceeds to step S43 wherein doors of the system-mounted vehicle 40 are locked. The routine then terminates. If a YES answer is obtained in step S40, only one or two of the operations in steps S41 to S43 may alternatively be achieved.

As apparent from the above discussion, the surroundings monitoring system 10 in this embodiment is designed to determine whether the approaching vehicle is now driving aggressively. When determining that the approaching vehicle is not driving aggressively, the ECU 30 inhibits the collision avoidance task from being performed depending upon the presence or absence of a non-target vehicle(s). Alternatively, when determining that the approaching vehicle is driving aggressively, the ECU 30 performs the alerting task, the videorecording task, and/or the locking task as described above. The surroundings monitoring system 10 is, therefore, capable of performing the alerting task, the videorecording task, and/or the locking task to lock the doors of the system-mounted vehicle 40 against the approaching vehicle expected to interrupt the movement of the system-mounted vehicle 40 and also performing the collision avoidance task for the approaching vehicle expected not to interrupt the movement of the system-mounted vehicle 40 depending upon the presence or absence of a non-target vehicle(s).

Instead of calculating the adjacent travel zone using a locus of movement of the system-mounted vehicle 40, the travel zone may be derived using an image captured by the imaging device 22.

The first embodiment has referred to inhibition of the warning task for a vehicle(s) approaching the system-mounted vehicle 40, but may also be designed to inhibit the warning task for an object, such as a pedestrian, approaching from behind the system-mounted vehicle 40.

The vehicle controllers or how to construct them referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations thereof referred to in this disclosure may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium.

This disclosure is not limited to the above embodiments, but may be realized by various embodiments without departing from the purpose of the disclosure. This disclosure includes all possible combinations of the features of the above embodiments or features similar to the parts of the above embodiments. The structures in this disclosure may include only one or some of the features discussed in the above embodiments unless otherwise inconsistent with the aspects of this disclosure.

The above embodiments realize the following unique structures.

First Structure

A surroundings monitoring system is provided for use with a system-mounted vehicle equipped with an object sensor which senses an object around the system-mounted vehicle. When an approaching vehicle that is a vehicle approaching from behind the system-mounted vehicle on a road where the system-mounted vehicle is moving is detected by the object sensor, the surroundings monitoring system works to perform a collision avoidance task depending upon whether a predetermined warning condition for the approaching vehicle is met. The surroundings monitoring system comprises: (a) a presence-of-non-target vehicle determiner which determines whether a non-target vehicle is present in a region on the road which is defined to extend from the system-mounted vehicle to the approaching vehicle, the non-target vehicle being a vehicle which does not meet the warning condition; and (b) a warning task inhibitor which, when the non-target vehicle is determined to be present, inhibits the collision avoidance task, which would be performed when the warning condition is met, from being performed for the approaching vehicle present behind the non-target vehicle.

Second Structure

The surroundings monitoring system as set forth in "FIRST STRUCTURE, further comprising a travel zone calculator which works to calculate a travel zone in which the approaching vehicle is expected to move in future. The warning task inhibitor inhibits the collision avoidance task from being performed in a condition where a region currently occupied by the non-target vehicle overlaps the travel zone.

Third Structure

The surroundings monitoring system as set forth in "SECOND STRUCTURE", wherein when the approaching vehicle is an object which is approaching from behind the system-mounted vehicle on an adjacent lane located adjacent to a host lane in which the system-mounted vehicle is moving. When the region occupied by the non-target vehicle does not overlap the travel zone, the warning task inhibitor works to inhibit the collision avoidance task from being performed depending upon whether the travel zone occupies a portion of the adjacent lane which is located close to or away from the system-mounted vehicle.

Fourth Structure

The surroundings monitoring system as set forth in "THIRD STRUCTURE", wherein when the non-target vehicle includes a plurality of non-target vehicles. When the region occupied by each of the non-target vehicles does not overlap the travel zone, and the travel zone is located away from the system-mounted vehicle in the adjacent lane, the warning task inhibitor defines, of an area where the warning condition is met for the approaching vehicle, a portion which is located between the system-mounted vehicle and a leading one of the non-target vehicles present behind the system-mounted vehicle as a collision avoidance task-implementation area where the collision avoidance task should be implemented.

Fifth Structure

The surroundings monitoring system as set forth in any one of "SECOND to FOURTH STRUCTURES", wherein when the approaching vehicle is an object which is present in a host lane in which the system-mounted vehicle is moving and is approaching from behind the system-mounted vehicle, and when the region occupied by the non-target vehicle overlaps the travel zone, the warning task inhibitor inhibits the collision avoidance task from being performed.

Sixth Structure

The surroundings monitoring system as set forth in any one of "FIRST to FIFTH STRUCTURES", further comprising a position calculator which calculates a change expected to occur in relative position of the non-target vehicle relative to the system-mounted vehicle. When the non-target vehicle is determined to be present, the warning task inhibitor inhibits the collision avoidance task from being performed based on the change in the relative position calculated by the position calculator.

What is claimed is:

1. A surroundings monitoring system for use with a system-mounted vehicle equipped with an object sensor which senses an object around the system-mounted vehicle, when an approaching vehicle that is a vehicle approaching from behind the system-mounted vehicle on a road where the system-mounted vehicle is moving is detected by the object sensor, the surroundings monitoring system working to perform a collision avoidance task depending upon whether a predetermined warning condition for the approaching vehicle is met, comprising:

a presence-of-non-target vehicle determiner which determines whether there is a non-target vehicle in a region on the road which is defined to extend from the system-mounted vehicle to the approaching vehicle, the non-target vehicle being a vehicle which does not meet the warning condition;

a warning task inhibitor which, when the non-target vehicle is determined to be present, inhibits the collision avoidance task, which would be performed when the warning condition is met, from being performed for the approaching vehicle present behind the non-target vehicle; and a travel zone calculator which calculates a travel zone in which the approaching vehicle is expected to move in the future, wherein the warning task inhibitor inhibits the collision avoidance task from being performed in a condition where a region currently occupied by the non-target vehicle overlaps the travel zone calculated by the travel zone calculator, when the approaching vehicle is an object which is approaching from behind the system-mounted vehicle on an adjacent lane located adjacent to a host lane in which the system-mounted vehicle is moving, and when the region occupied by the non-target vehicle does not overlap the travel zone, the warning task inhibitor works to perform the collision avoidance task depending upon whether the travel zone occupies a portion of the adjacent lane which is located close to or away from the system-mounted vehicle.

2. The surroundings monitoring system as set forth in claim 1, wherein when the non-target vehicle includes a plurality of non-target vehicles, when the region occupied by each of the non-target vehicles does not overlap the travel zone, and the travel zone is located away from the system-mounted vehicle in the adjacent lane, the warning task inhibitor defines, of an area where the warning condition is met for the approaching vehicle, a portion which is located between the system-mounted vehicle and a leading one of the non-target vehicles present behind the system-mounted vehicle as a collision avoidance task-implementation area where the collision avoidance task should be implemented.

3. The surroundings monitoring system as set forth in claim 1, further comprising a position calculator which calculates a change expected to occur in relative position of the non-target vehicle relative to the system-mounted vehicle, and wherein when the non-target vehicle is determined to be present, the warning task inhibitor inhibits the collision avoidance task from being performed based on the change in the relative position calculated by the position calculator.

4. A surroundings monitoring system for use with a system-mounted vehicle equipped with an object sensor which senses an object around the system-mounted vehicle, when an approaching vehicle that is a vehicle approaching from behind the system-mounted vehicle on a road where the system-mounted vehicle is moving is detected by the object sensor, the surroundings monitoring system working to perform a collision avoidance task depending upon whether a predetermined warning condition for the approaching vehicle is met, comprising:

a presence-of-non-target vehicle determiner which determines whether a non-target vehicle is present in a region on the road which is defined to extend from the system-mounted vehicle to the approaching vehicle, the non-target vehicle being a vehicle which does not meet the warning condition; and a warning task inhibitor which, when the non-target vehicle is determined to be present, inhibits the collision avoidance task, which would be performed when the warning condition is met, from being performed for the approaching vehicle present behind the non-target vehicle, wherein when the approaching vehicle is an object which is present in a host lane in which the system-mounted vehicle is moving and is approaching from behind the system-mounted vehicle, and when the region occupied by the non-target vehicle overlaps the travel zone, the warning task inhibitor inhibits the collision avoidance task from being performed.

5. The surroundings monitoring system as set forth in claim 4, further comprising a position calculator which calculates a change expected to occur in relative position of the non-target vehicle relative to the system-mounted vehicle, and wherein when the non-target vehicle is determined to be present, the warning task inhibitor inhibits the collision avoidance task from being performed based on the change in the relative position calculated by the position calculator.

6. A non-transitory computer-readable storage medium for use in a host vehicle equipped with an object sensor which senses an object around the host vehicle, the program being executed by a controller, when an approaching vehicle that is a vehicle approaching from behind the host vehicle on a road where the host vehicle is moving is detected by the object sensor, a collision avoidance task being performed depending upon whether a predetermined warning condition for the approaching vehicle is met, comprising:

a presence-of-non-target vehicle determining step which determines whether a non-target vehicle is present in a region on the road which is defined to extend from the host vehicle to the approaching vehicle, the non-target vehicle being a vehicle which does not meet the warning condition; and a warning task inhibiting step which, when the non-target vehicle is determined to be present, inhibits the collision avoidance task, which would be performed when the warning condition is met, from being performed for the approaching vehicle present behind the non-target vehicle; and a travel zone calculating step which calculates a travel zone in which the approaching vehicle is expected to move in the future, wherein the warning task inhibiting step inhibits the collision avoidance task from being performed in a condition where a region currently occupied by the non-target vehicle overlaps the travel zone calculated by the travel zone calculating step, when the approaching vehicle is an object which is approaching from behind the host vehicle on an adjacent lane located adjacent to a host lane in which the host vehicle is moving, and when the region occupied by the non-target vehicle does not overlap the travel zone, the warning task inhibiting step works to perform the collision avoidance task depending upon whether the travel zone occupies a portion of the adjacent lane which is located close to or away from the host vehicle.

7. The non-transitory computer-readable storage medium as set forth in claim 6, wherein when the non-target vehicle includes a plurality of non-target vehicles, when the region occupied by each of the non-target vehicles does not overlap the travel zone, and the travel zone is located away from the host vehicle in the adjacent lane, the warning task inhibiting step defines, of an area where the warning condition is met for the approaching vehicle, a portion which is located between the host vehicle and a leading one of the non-target vehicles present behind the host vehicle as a collision avoidance task-implementation area where the collision avoidance task should be implemented.

8. The non-transitory computer-readable storage medium as set forth in claim 6, further comprising a position calculating step which calculates a change expected to occur in relative position of the non-target vehicle relative to the host vehicle, and wherein when the non-target vehicle is determined to be present, the warning task inhibiting step inhibits the collision avoidance task from being performed based on the change in the relative position calculated by the position calculating step.

\* \* \* \* \*